Jan. 29, 1924.

A. NUHN 1,481,925

LIGHTER

Filed March 7, 1923

Albert Nuhn
INVENTOR

BY Victor J. Evans
ATTORNEY

WITNESS:

Patented Jan. 29, 1924.

1,481,925

UNITED STATES PATENT OFFICE.

ALBERT NUHN, OF VERMILION, OHIO.

LIGHTER.

Application filed March 7, 1923. Serial No. 623,485.

*To all whom it may concern:*

Be it known that I, ALBERT NUHN, a citizen of the United States, residing at Vermilion, in the county of Erie and State of Ohio, have invented new and useful Improvements in Lighters, of which the following is a specification.

This invention relates to a cigar lighter for motor vehicles, the general object of the invention being to provide an electric lighter with means for attaching it to the steering wheel of the vehicle.

Another object of the invention is to provide a simple switch for controlling the flow of current to the lighter wires.

This invention also consists in certain other features of construction and in the combination and arrangement of the several parts, to be hereinafter fully described, illustrated in the accompanying drawings, and specifically pointed out in the appended claim.

In describing my invention in detail, reference will be had to the accompanying drawings wherein like characters denote like or corresponding parts throughout the several views, and in which:—

Figure 1:
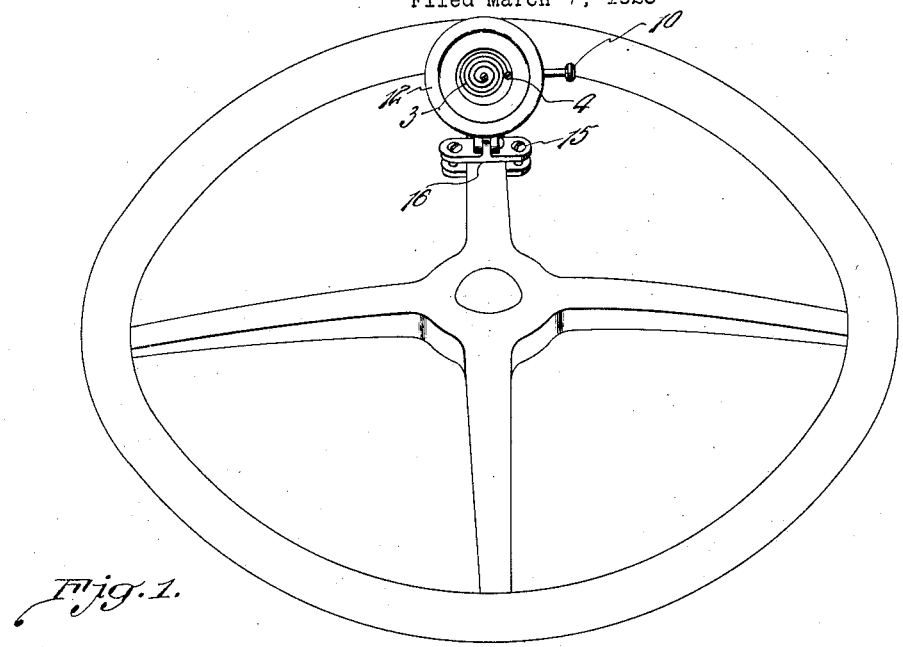
Figure 1 is a front view showing the device attached to a steering wheel.
Figure 2:
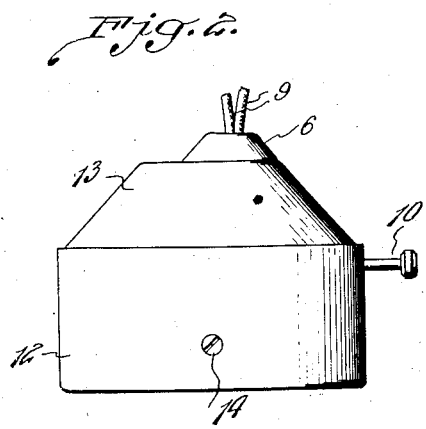
Figure 2 is a top view.
Figure 3:
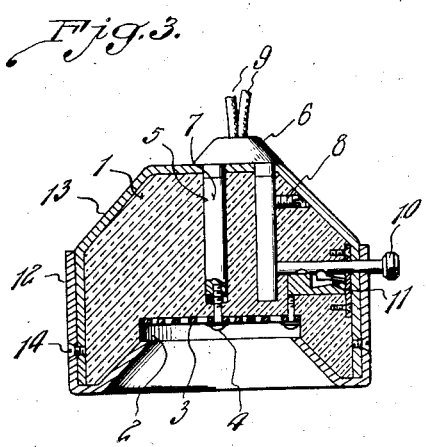
Figures 3 and 4 are detail views.
Figure 4:
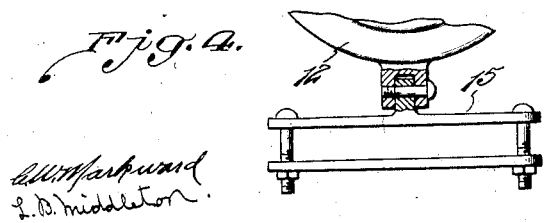

In these views 1 indicates a porcelain body which is provided with the recess 2 which has a frusto-conical outer part and a cylindrical body. A heating coil 3 of wire is arranged in the cylindrical part of the recess and is held in place by the terminal screws 4 which pass through the bottom of the recess into the holes 5 formed in the rear part thereof. A plug 6 has brass strips 7 secured thereto which enter the holes 5 so as to hold the plug in place, the strips being held in position by the screw 8. The conductors 9 are connected with the plug and these conductors are adapted to be connected with the battery or other source of supply. A push button switch 10 is arranged in the device for completing the circuit to the coil 3, said switch being held by a spring 11 in its retracted and projected positions. A cover formed of the parts 12 and 13 encloses the device, the two parts being held together by the screws 14. The front cover is provided with an opening for permitting the cigar or cigarette to be inserted in the recess 2 of the porcelain body against the coil so that when the switch is closed the coil will become hot and thus ignite the cigar or cigarette. A clamp 15 is connected with the body and is adapted to engage a spoke of the steering wheel, as shown at 16 in Figure 1.

By this invention the driver of a motor vehicle can light his cigar or cigarette without the use of matches so that it is not necessary for him to stop the vehicle in order to strike matches to light his cigar or cigarette.

It is thought from the foregoing description that the advantages and novel features of my invention will be readily apparent.

I desire it to be understood that I may make changes in the construction and in the combination and arangement of the several parts, provided that such changes fall within the scope of the appended claim.

What I claim is:—

A lighter of the class described comprising a porcelain body having a recess in its front, the outer part of which is of frusto conical shape, a heating coil in the bottom of the recess, a two-part cover for the body, one part having a portion overlapping a portion of the other and the front part having an opening with sloping walls which engage the frusto-conical part of the recess in the body, a strip passing through the body and connected with the coil, a second strip passing through the body but spaced from the coil, a switch block electrically connected with the coil, a plunger switch member adapted to be moved into and out of engagement with the short strip, a plug connected with the strips, means for connecting the plug to a source of supply and a clamp connected with the device.

In testimony whereof I affix my signature.

ALBERT NUHN.